UNITED STATES PATENT OFFICE.

WILLIAM H. DAMON, OF LOS ANGELES, CALIFORNIA.

FURNITURE AND AUTOMOBILE POLISH.

1,302,320.   Specification of Letters Patent.   Patented Apr. 29, 1919.

No Drawing.   Application filed August 7, 1918.   Serial No. 248,768.

*To all whom it may concern:*

Be it known that I, WILLIAM H. DAMON, a citizen of the United States, residing at Los Angeles, in the county of Los Angeles and State of California, have invented new and useful Improvements in Furniture and Automobile Polish, of which the following is a specification.

My invention relates to a polish for automobiles, furniture and the like.

In my U. S. Letters Patent No. 1240544 for non-cumulative wax polish, September 18, 1917, and No. 1240545 for non-cumulative wax polish, September 18, 1917, I have described a polish composed of water, soap, diatomaceous earth, wax, and a hydrocarbon solvent for the wax. The polishes covered by the patents just referred to give excellent results, especially on fairly new varnished or enameled surfaces. I have found, however, that the same dry somewhat too quickly, which is especially noticeable in dry weather, necessitating a quick application of the polish and a vigorous rubbing of the surface to which the polish is applied, lest it leave a streaky or cloudy surface.

It is the object of the present invention to improve the polishes covered by said patents, to overcome the defects mentioned, whereby an improved polish is produced having slower drying qualities, and which is also adapted to restoring the original color of old surfaces, due to the penetrating qualities of the improved polish.

My invention consists in the novel composition hereinafter described and claimed.

I take 90 gallons of water, heat the same and add 10 pounds of a good quality of soap, preferably "Ivory" soap; I then add and thoroughly mix 30 pounds of an extremely finely powdered abrasive, such as diatomaceous earth, iron oxid, kaolin, fullers' earth and the like. An abrasive of comparatively low specific gravity finely powdered, and not having what is called a "tooth", which would be objectionable because of its dulling effect on the varnished surface, may be used. It is desirable to have an abrasive of low specific gravity in order that the same may be carried in suspension in the polish without rapid settling. I then take 90 gallons of petroleum distillate, including coal oil and gasolene, preferably from 45 to 60° gravity (Baumé) and dissolve therein 30 pounds of paraffin wax. I then add to the wax solution 18 gallons of heavy hydrocarbon oil, such as paraffin oil. Then I add the wax and oil mixture to the aqueous soap mixture and mix the same thoroughly to form a homogeneous emulsion in which the oil, wax, distillate, and abrasive, are suspended.

In place of the petroleum distillate any other light hydrocarbon may be substituted, such as turpentine and benzol. In place of the paraffin wax other mineral waxes, such as cerosin or animal, or vegetable waxes may be used. For the paraffin oil other non-drying oils, either vegetable or animal, may be substituted.

A small quantity of perfume may be added to the emulsion to give it an agreeable odor.

The soap and water of the polish together with the mild abrasive serve to clean the varnished or enameled surface to which it is applied, while the wax will form an exceedingly fine hard film, filling the minute pores or cracks of the surface with perfect finish, which is dust and water-proof, acid-proof and finger-mark proof.

The polish is applied to the surface by a soft cloth or chamois skin, and rubbed off with a dry soft cloth producing a brilliant, hard, glossy polish with comparatively little rubbing.

The oil of the composition prevents the rapid drying of the same when applied to the surface; it also strikes into the porous finish of the old surface, and restores its original color. The oil is not apparent on the polished surface after the polish is rubbed off, and does not cause a dust collecting surface.

The abrasive, especially when the polish is applied on the surfaces which are comparatively clean, may be omitted, also the wax.

While I have stated, the relative proportions of the ingredients of the polish which I have found to produce the best results, the same may be varied within wide limits, as will be understood by those skilled in the art, without departing from the spirit of my invention, as claimed.

I claim:

1. A polish containing water, soap and a mild finely powdered abrasive of low specific gravity, wax, a solvent for wax, and a non-drying oil.

2. A polish composed of ingredients in the proportion as stated, water 90 gallons, soap 10 pounds, a mild abrasive of low specific gravity 30 pounds, wax 30 pounds, a hydrocarbon solvent for wax 90 gallons, and a non-drying oil 18 gallons.

3. A polish containing water, soap, petroleum distillate, and paraffin oil in the form of an emulsion.

4. A polish containing water, soap, a non-drying oil, and a fluid hydrocarbon of comparatively low specific gravity, in the form of an emulsion.

In testimony whereof I have signed my name to this specification.

WILLIAM H. DAMON.